(12) United States Patent
Zima

(10) Patent No.: US 11,504,641 B2
(45) Date of Patent: Nov. 22, 2022

(54) LIGHTER-THAN-AIR DRONE

(71) Applicant: Brian Zima, Miami Beach, FL (US)

(72) Inventor: Brian Zima, Miami Beach, FL (US)

( * ) Notice: Subject to any disclaimer, the term of this patent is extended or adjusted under 35 U.S.C. 154(b) by 492 days.

(21) Appl. No.: 16/656,554

(22) Filed: Oct. 17, 2019

(65) Prior Publication Data

US 2021/0113935 A1 Apr. 22, 2021

(51) Int. Cl.
| | |
|---|---|
| *A63H 27/10* | (2006.01) |
| *B64D 47/02* | (2006.01) |
| *B64D 47/08* | (2006.01) |
| *B64B 1/40* | (2006.01) |
| *G05D 1/00* | (2006.01) |
| *A63H 30/04* | (2006.01) |
| *B64C 39/02* | (2006.01) |

(52) U.S. Cl.
CPC .............. *A63H 27/10* (2013.01); *A63H 30/04* (2013.01); *B64B 1/40* (2013.01); *B64C 39/024* (2013.01); *B64D 47/02* (2013.01); *B64D 47/08* (2013.01); *G05D 1/0011* (2013.01); *A63H 2027/1058* (2013.01); *A63H 2027/1066* (2013.01); *B64C 2201/022* (2013.01); *B64C 2201/042* (2013.01); *B64C 2201/101* (2013.01); *B64C 2201/108* (2013.01); *B64C 2201/127* (2013.01); *B64C 2201/146* (2013.01); *B64C 2201/162* (2013.01); *B64C 2203/00* (2013.01)

(58) Field of Classification Search
CPC ....... B64B 1/26; B64B 1/28; B64C 2201/022; B64C 2201/101; B64C 11/001; B64C 11/48; A63H 2027/1066; A63H 27/10
See application file for complete search history.

(56) References Cited

U.S. PATENT DOCUMENTS

| | | | |
|---|---|---|---|
| 4,729,750 A | 3/1988 | Prusman | |
| 4,931,028 A | 6/1990 | Jaeger et al. | |
| 5,149,015 A | 9/1992 | Davis | |
| 5,429,542 A | 7/1995 | Britt, Jr. | |
| 5,906,335 A | 5/1999 | Thompson | |
| 6,364,733 B1 | 4/2002 | Escauriza | |
| 6,520,824 B1 | 2/2003 | Caroselli | |
| 7,055,777 B2 | 6/2006 | Colting | |
| 8,303,367 B2 | 11/2012 | English | |
| 10,000,284 B1 * | 6/2018 | Purwin | ................ B64B 1/26 |
| 2008/0090487 A1 | 4/2008 | Randall | |
| 2008/0268742 A1 | 10/2008 | Shenhar | |
| 2013/0035017 A1 | 2/2013 | English | |
| 2018/0281949 A1 * | 10/2018 | Mitchell | ............. B64C 17/00 |

FOREIGN PATENT DOCUMENTS

| | | | |
|---|---|---|---|
| CN | 202295280 | | 7/2012 |
| CN | 107685854 A | * | 2/2018 |

* cited by examiner

*Primary Examiner* — Timothy D Collins
*Assistant Examiner* — Eric Acosta
(74) *Attorney, Agent, or Firm* — LaMorte & Associates, P.C.

(57) ABSTRACT

A lighter-than-air toy drone having at least one balloon that is inflated with a lift gas. The drone has a first conduit progresses along a first axis and a second conduit that progresses along a perpendicular second axis. At least one motorized propeller is provided that can selectively moving air through the first conduit and the second conduit to propel the drone. The motorized propeller can also generate a gyroscopic force that acts to rotate said at least one balloon for directional steering.

12 Claims, 10 Drawing Sheets

LIGHTER-THAN-AIR DRONE

BACKGROUND OF THE INVENTION

1. Field of the Invention

In general, the present invention relates to flying toys, such as toy drones. More particularly, the present invention relates to the structure of toy drones that are lighter-than-air and stay aloft due to buoyant forces of a lift gas.

2. Prior Art Description

Small flying toys in the form of toy helicopters and toy quadcopters are becoming increasingly popular in the marketplace. Such toys are known as toy drones in the industry. Toy drones are typically battery operated. The size and motor power of a drone determines the weight that the drone is capable of bringing into flight. As a consequence, small toy drones typically carry small batteries that can power the drone for only short periods of time. Furthermore, toy drones are typically provided with small plastic propellers that are unlikely to cause harm if contacted while spinning. Accordingly, most toy drones have batteries and blade configurations that are only capable of keeping them aloft for less than ten minutes before the batteries need to be recharged. A great need therefore exists in the industry for a small lightweight drone that is not dangerous to touch, yet is capable of staying aloft in flight for long periods of time.

One way to increase the ability of a toy drone to stay aloft is to decrease the buoyant weight of the toy drone in air. The less a drone weighs, the less power is required to keep it aloft. The less power that is required, the longer the batteries carried by the drone will last. In the prior art, there have been toy drones designed that are lighter-than-air. Such prior art is exemplified by U.S. Pat. No. 4,931,028 to Jager, entitled "Toy Blimp", and U.S. Pat. No. 5,429,542 to Britt, entitled "Helium Filled Remote Controlled Saucer Toy". These prior art drones use helium filled bodies to fly. Altitude and direction of flight are controlled by remotely controlled motors.

In U.S. Pat. No. 6,520,824 to Caroselli, entitled "Toy Balloon Vehicle", a control unit is disclosed that is designed to attach to one or more latex balloons that are filled with helium. As with the previously cited prior art, the control unit steers and propels the lighter-than-air construct.

One problem associated with lighter-than-air toys is that the altitude of the toy is very difficult to control. Lighter-than-air toys are very light and are easily moved by even a slight breeze or updraft. Furthermore, air density varies from point to point as does air temperature. All of these variables affect the altitude of a lighter-than-air toy. In all the previously cited prior art, the battery-powered motors are used to help control the altitude of the lighter-than-air toy. This causes the control motors on the toys to constantly run as they compensate for wind drift. The constant running of the control motors consumes battery power and diminishes the effective lime that the lighter-than-air toy can stay aloft.

In U.S. Pat. No. 5,149,015 to Davis, entitled "Radio Controlled Hot Air Balloon", a toy hot air balloon, commonly known as a Chinese lantern, is fitted with a controller. The controller selectively increases the size of a burning flame. This changes the temperature of the air within the balloon and the buoyancy of the balloon. This can help the toy rise if caught in a down draft. However, the control has a large time delay and can do nothing to compensate for an updraft.

In U.S. Patent Application Publication No. 2019/003447 to Zima, a lighter-than-air drone is disclosed that controls up and down movements using ballast and/or venting of the lifting gas. This system utilizes ballast and lift gas as a consumable during operations. However, both ballast and lift gas are in limited supply on the drone. The drone, therefore, can only be adjusted in flight a limited amount of times before the ballast and/or lifting gas has to be replenished.

A need therefore exists for an improved lighter-than-air drone, wherein rapid adjustments in altitude can be achieved without having to constantly run control propellers and/or change ballast. In this manner, no ballast replenishment is required and battery power is conserved. This enables the lighter-than-air drone to be kept aloft in controlled flight for extended periods of time. This need is met by the present invention as described and claimed below.

SUMMARY OF THE INVENTION

The present invention is a lighter-than-air toy drone assembly. The drone assembly utilizes a propulsion module that is kept aloft by at least one balloon. The propulsion module contains a first conduit that progresses along a first axis. In flight, the first axis is vertically oriented. A first motorized propeller selectively moves air through the first conduit, therein propelling the drone assembly either upwardly or downwardly. The direction of propulsion depends upon the direct of air movement through the first conduit.

A second conduit is provided in the propulsion module that progresses along a second axis. The second axis is perpendicular to the first axis and is oriented in the horizontal during flight. At least one second motorized propeller is provided in the second conduit for selectively moving air through said second conduit, therein propelling the drone assembly laterally. The direction of propulsion depends upon the direct of air movement through the first conduit. Furthermore, the motorized propellers in the second conduit can generate gyroscopic forces that can be used to turn the drone assembly.

A controller is used to selectively control the motorized propellers. The controller receives remote control command signals that can be Bluetooth® signals. Onboard sensors may also be provided to provide the drone assembly some ability to fly autonomously. At least one battery is provided for powering the motorized propellers.

At least one balloon is provided that is inflated with a lift gas. The balloon, or balloons, support the remaining components in flight. The balloon or balloons do not intersect either the first axis or the second axis of the conduits. In this manner, air flowing through the conduits do not act directly upon the balloons in flight.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
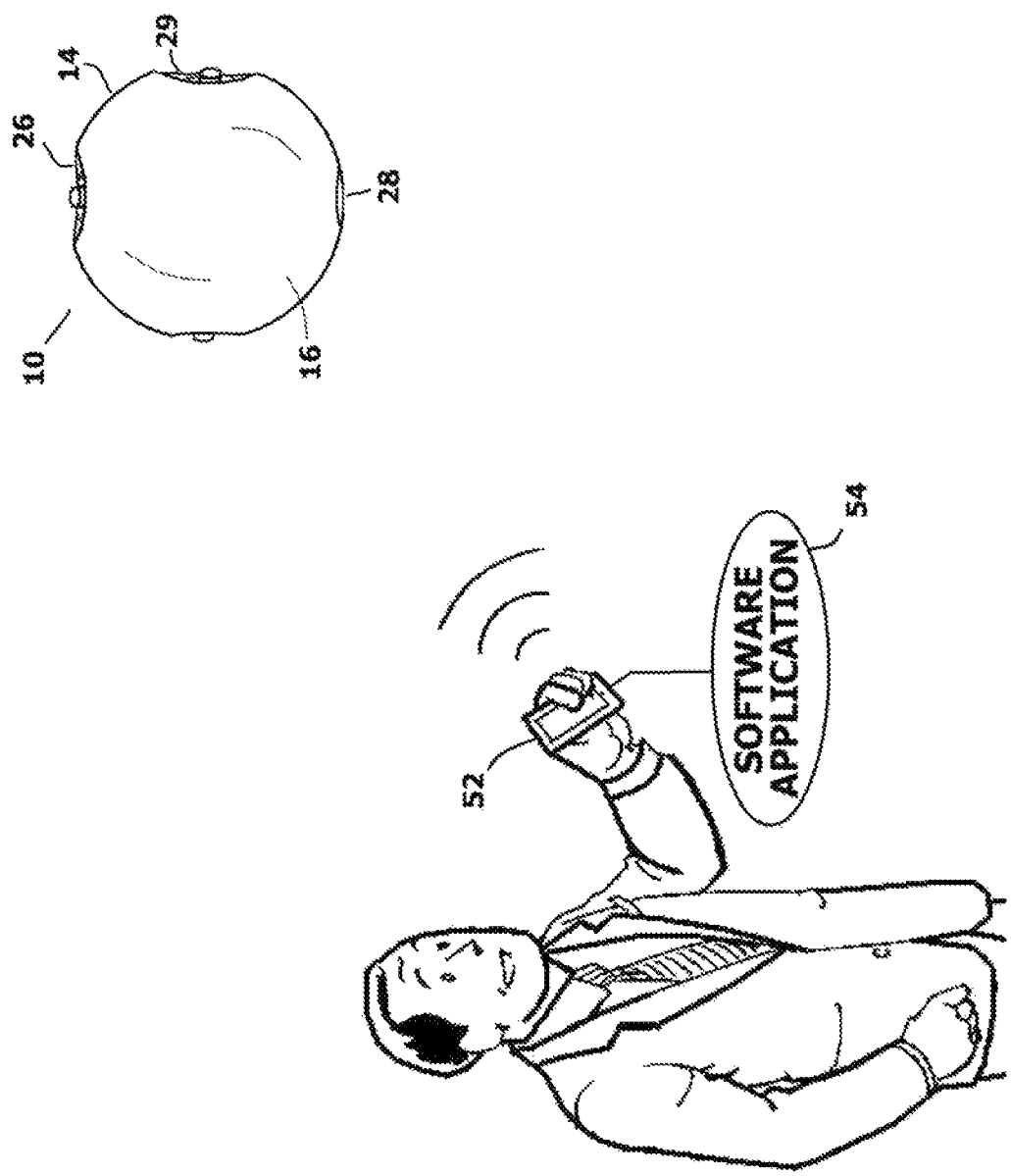
FIG. 1 is a perspective view of an exemplary embodiment of a toy drone assembly shown in conjunction with a user having a smart phone that generates a personal data network.
Figure 2:
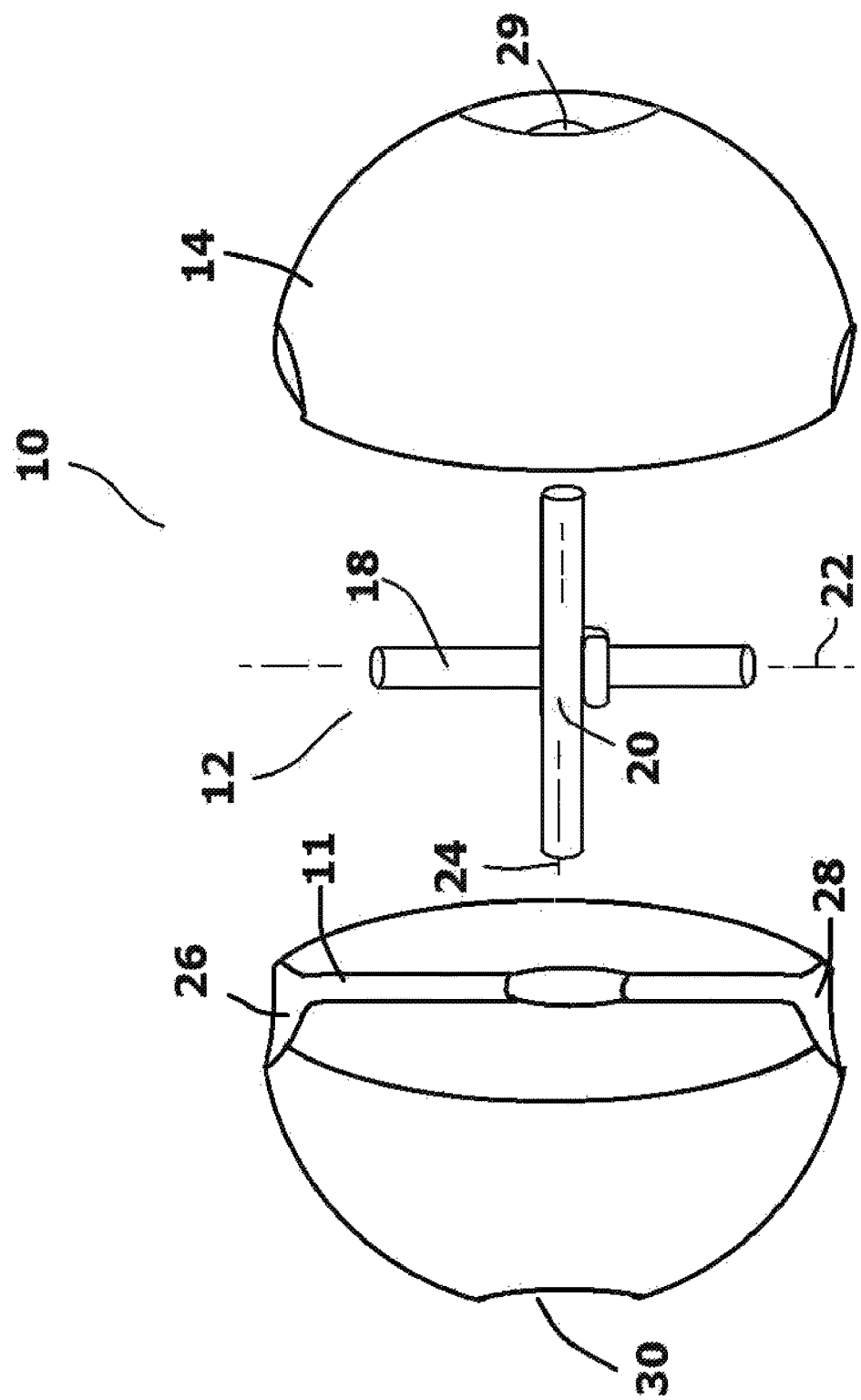
FIG. 2 is an exploded fragmented view of the exemplary toy drone assembly.

Although the present invention lighter-than-air drone can be embodied in many ways, only a few exemplary embodiments are illustrated and described. The exemplary embodiments are selected in order to set forth some of the best modes contemplated for the invention. The illustrated embodiments, however, are merely exemplary and should not be considered limitations when interpreting the scope of the appended claims. Referring to FIG. 1 and FIG. 2, a first embodiment of a lighter-than-air drone assembly 10 is shown. The drone assembly 10 includes a propulsion module 12 set within a specialized balloon construct 14. As will later be explained, the balloon construct 14 can be one custom-shaped balloon, or an assemblage of balloons. In the shown embodiment, the balloon construct 14 is a spherical balloon having a centralized opening 11 that is accessible through an open top 26, an open bottom 28, and two side openings 29, 30.

A propulsion module 12 is placed inside the balloon construct 14. The propulsion module 12 contains a first conduit 18 and a second conduit 20. The first conduit 18 progresses along a first axis 22 and the second conduit 20 progresses along a perpendicular second axis 24. The first conduit aligns with the opening top 26 and the bottom open bottom 28 in the balloon construct 14. The second conduit 20 aligns with the two side openings 29, 30 in the balloon construct 14. The drone assembly 10 is controlled by moving air through the first conduit 18 and the second conduit 20. Air moving through the first conduit 18 can propel the drone assembly 10, either up or down, depending upon the direction of air flow. Likewise, air moving through the second conduit 20 can propel the drone assembly 10 laterally. The balloon construct 14 is configured so that it does not intersect either the first axis 22 of the first conduit 18 or the second axis 24 of the second conduit 20. In this manner, the flow of air through the conduits 18, 20 does not act directly against any surface of the balloon construct 14. In the shown embodiment, the open top 26 and an open bottom 28 of the balloon construct 14 align with the first conduit 18. The two opposing side openings 29, 30 of the balloon construct 14 align with the second conduit 20. In flight, the open top 26 and the open bottom 28 are vertically aligned. The two opposing side openings 29, 30 are horizontally aligned. The open top 26, the open bottom 28 and the side openings 29, 30 are symmetric so that air flowing through any of these openings would not cause the drone assembly 10 to spin. Rather, air flow would only act to move the drone assembly 10 either vertically or horizontally.

Figure 3:
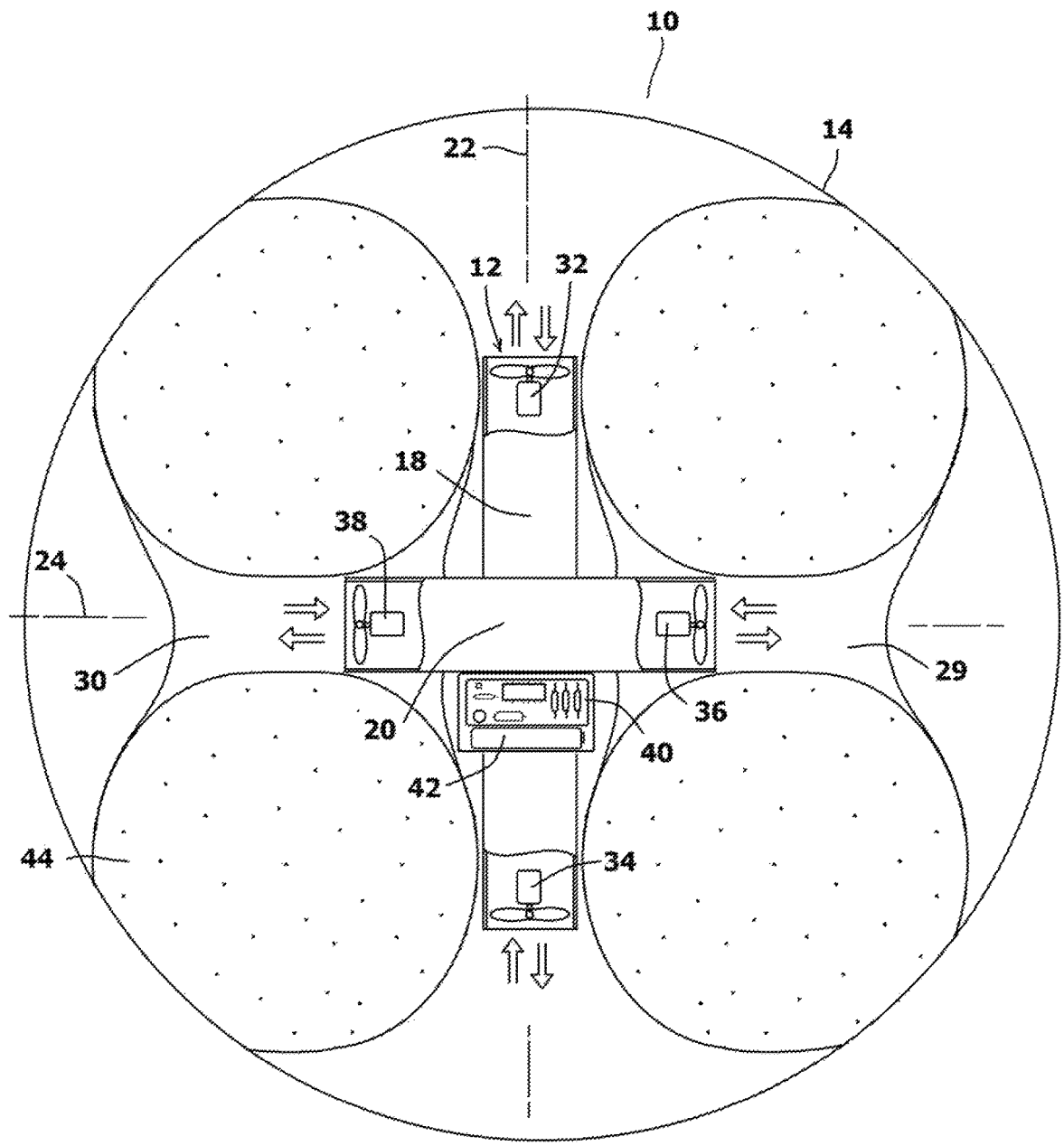
FIG. 3 is a cross-sectional view of the exemplary toy drone assembly demonstrating vertical flight controls.

Referring to FIG. 3 in conjunction with FIG. 1 and FIG. 2, it can be seen that the first conduit 18 and the second conduit 20 are arranged at a perpendicular. The first conduit 18 and the second conduit 20 align with the various openings in the balloon construct 14. In the shown embodiment, two motorized propellers 32, 34 are disposed in the first conduit 18. Likewise, two additional motorized propellers 36, 38 are disposed in the second conduit 20. The motorized propellers 32, 34, 36, 38 are preferably reversible. That is, each of the motorized propellers 32, 34, 36, 38 can be caused to rotate either clockwise or counterclockwise as directed by a controller 40 and powered by at least one battery 42.

The propulsion module 12 embodies the first conduit 18, the second conduit 20, the motorized propellers 32, 34, 36, 38, the controller 40 and the battery 42. The propulsion module 12 has a weight. The weight of the propulsion module 12 is balanced by a lift force provided by the balloon construct 14.

The propulsion module 12 is positioned slightly below the center of gravity for the balloon construct 14. This will make the overall drone assembly 10 slightly bottom heavy and will maintain the open top 26 and the open bottom 28 in a vertical orientation during flight.

The balloon construct 14 is filled with a lift gas, such as helium, that is lighter than air. The displacement of the balloon construct 14 is equal to the weight of the propulsion module 12 with batteries 42. In this manner, when the balloon construct 14 is inflated, the overall drone assembly 10 has a neutral buoyancy. This enables the drone assembly 10 to maintain a selected altitude with little or no motorized assistance. As such, the drone assembly 10 can stay aloft and in controlled flight, for long periods of time without exhausting the batteries 42.

Figure 4:
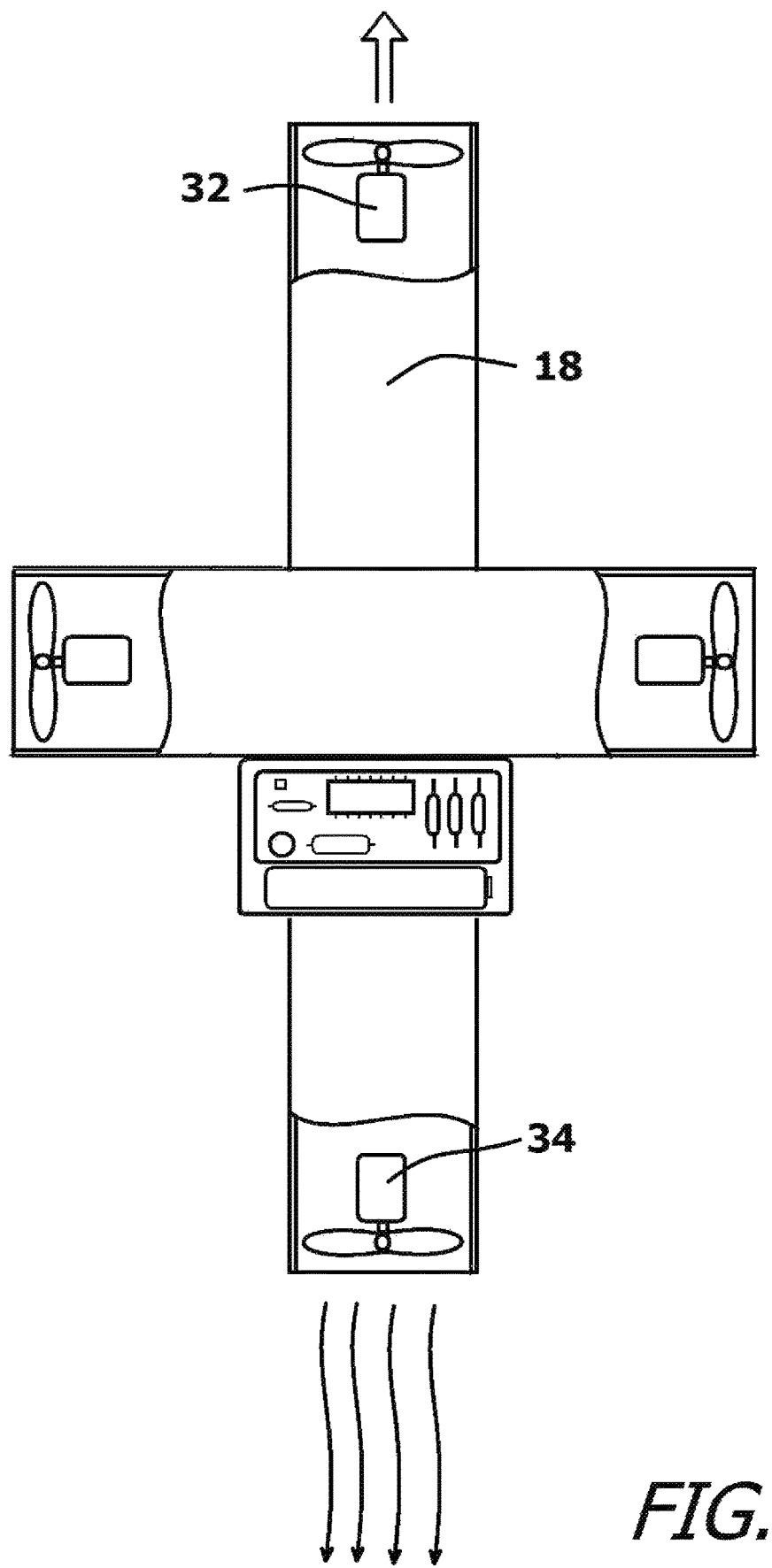
FIG. 4 is a cross-sectional view of the exemplary toy drone assembly demonstrating horizontal flight controls.

Referring to FIG. 4 in conjunction with FIG. 2 and FIG. 3 it can be seen that in order to increase the altitude of the drone assembly 10 in flight, at least one of the motorized propellers 32, 34 in the first conduit 18 is activated to create a downward flow of air in the first conduit 18. This draws air into the top of the first conduit 18 and out of its bottom. The result is that an upward force is created that can move the drone assembly 10 upward. To decrease the altitude of the drone system 10 in flight, at least one of the motorized propellers 32, 34 in the first conduit 18 is activated to create an upward flow of air in the first conduit 18. The result is that an opposing downward force is created that moves the drone assembly 10 downward. It will be further understood that the upward force or the downward force can be controlled by varying the speed of the motorized propellers 32, 34. Likewise, the motorized propellers 32, 34 can be run simultaneously to double the power available for a change in elevation.

Figure 5:
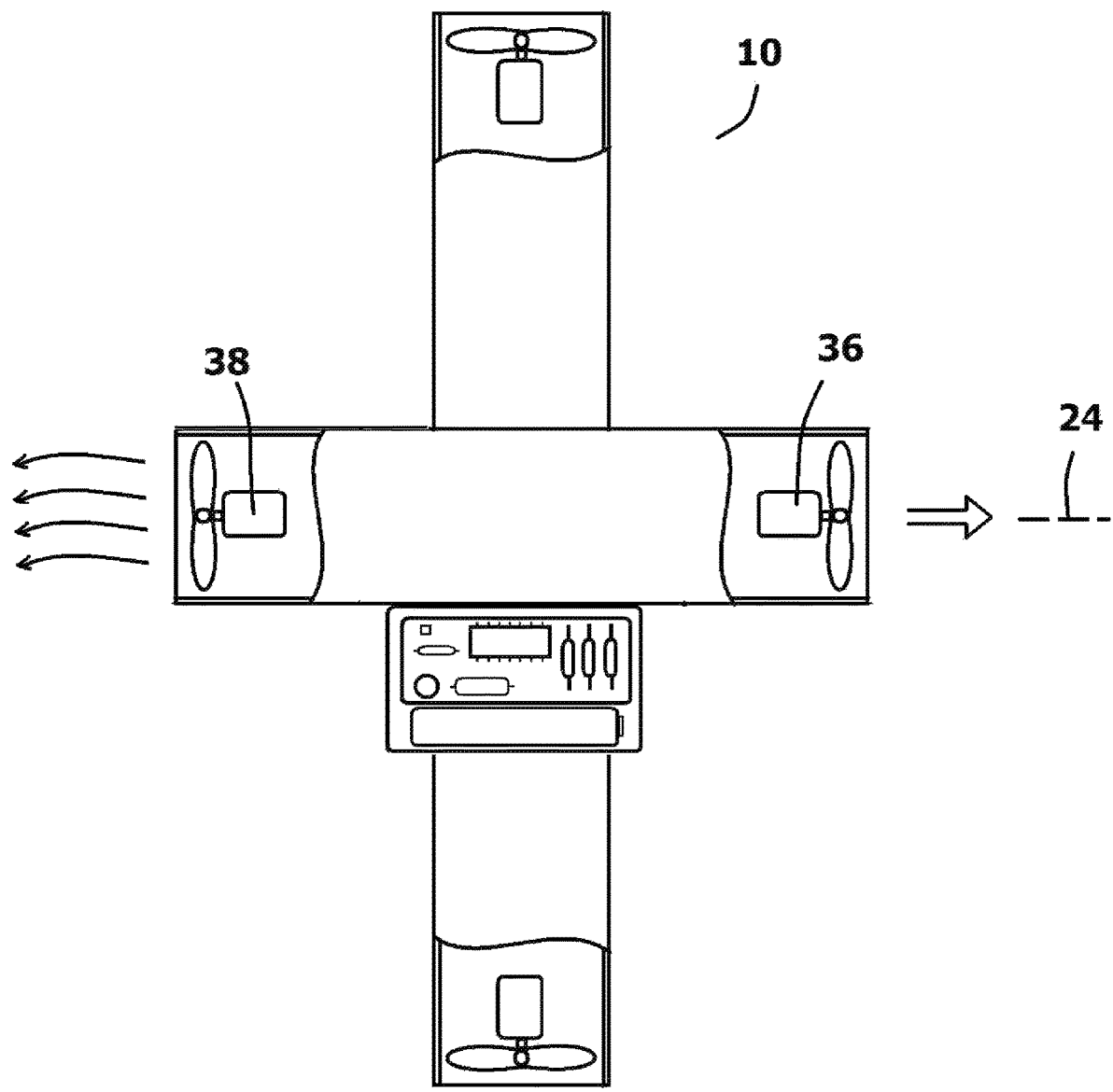
FIG. 5 is a cross-sectional view of the exemplary toy drone assembly demonstrating lateral flight controls.

Referring to FIG. 5, it will be understood that to move the drone assembly 10 laterally, one or both of the motorized propellers 36, 38 in the second conduit 20 are operated. When one of the motorized propellers 36, 38 is operated, the drone assembly 10 will be propelled laterally in the direction of the horizontal second axis 24. The force can be controlled by varying the speed of the motorized propellers 36, 38 and/or by running the two motorized propellers 36, 38 in a manner to create a complementary airflow.

Figure 6:
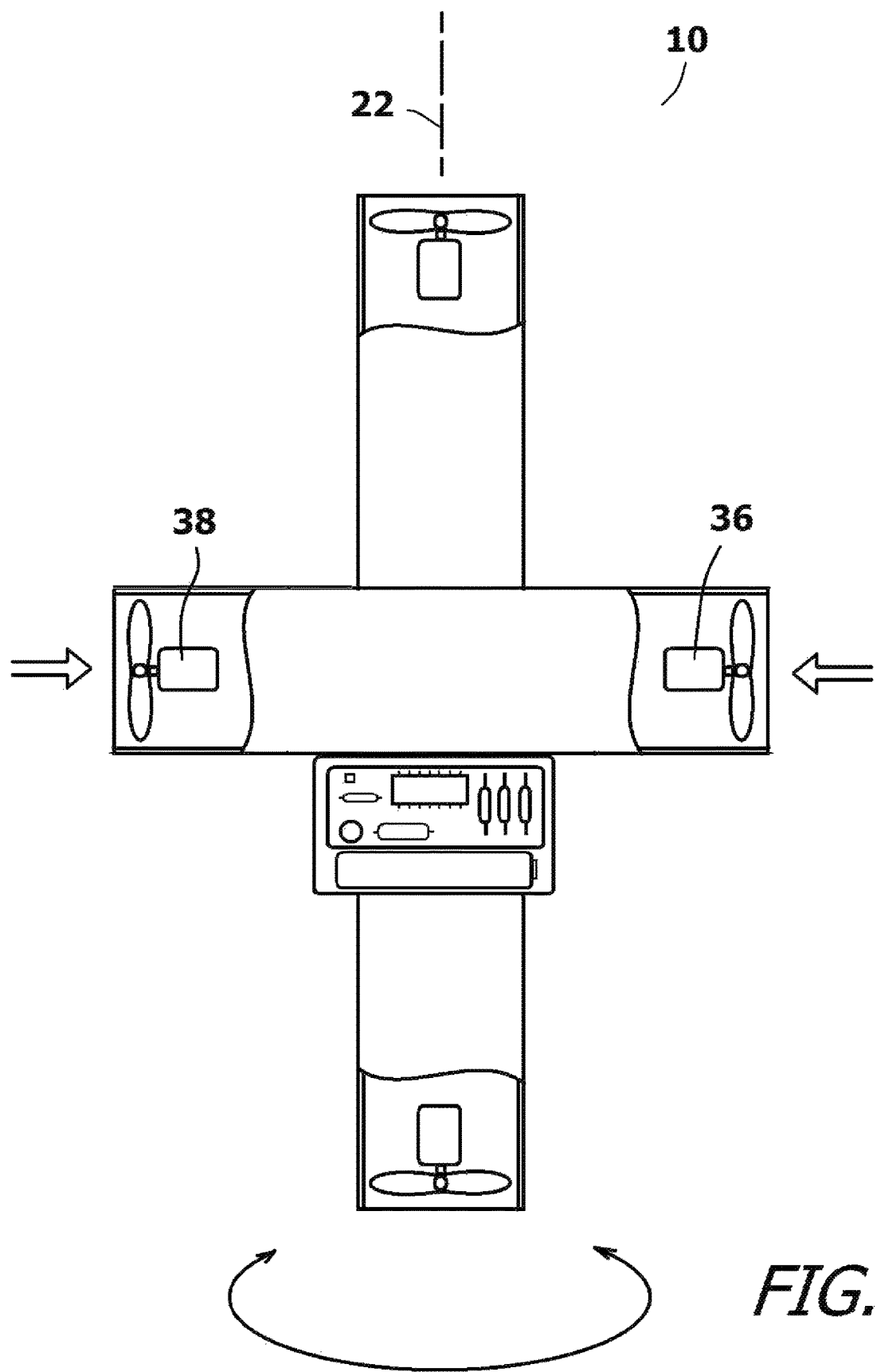
FIG. 6 is a cross-sectional view of the exemplary toy drone assembly demonstrating turning flight controls.

The operations of the motorized propellers 32, 34, 36, 38 combine to provide both altitude flight controls and lateral propulsion. However, the lateral propulsion is available only in the directions of the second axis 24 of the second conduit 20. Referring to FIG. 6, it can be seen that the ability to steer the drone assembly 10 comes from the ability to rotate the drone assembly 10 about its vertical axis 22. This can be achieved using gyroscopic forces. If the two motorized propellers 36, 38 are run simultaneously with opposing air flows, the two motorized propellers 36, 38 will create equal and opposite forces. The drone assembly 10 will, therefore, not move laterally. However, since the two motorized propellers 36, 38 are rotating in opposite directions, a gyroscopic force is created. The gyroscopic force acts in a plane perpendicular to the planes of rotation. Accordingly, the gyroscopic force causes the drone assembly 10 to rotate around its vertical first axis 22. The motorized propellers 36, 38 can, therefore, be operated in unison until the drone assembly 10 rotates into a desired orientation. Once in a desired orientation, one of the motorized propellers 36, 38 can be stopped or reversed to create lateral propulsion.

Figure 7:
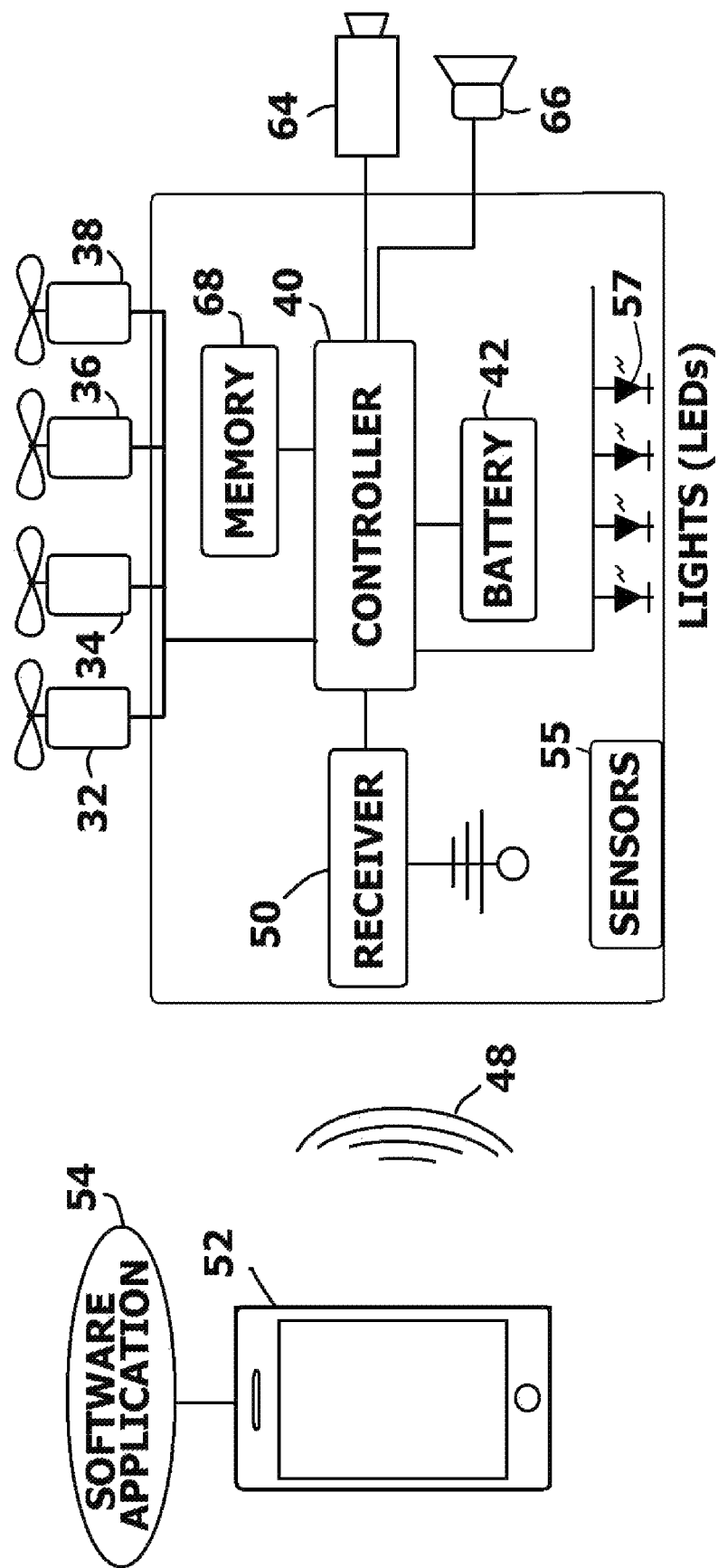
FIG. 7 is a schematic illustrating major electronic components contained within the exemplary toy drone assembly.

Referring to FIG. 7 in conjunction with FIG. 3, it will be understood that the motorized propellers 32, 34, 36, 38 are connected to the controller 40. The controller 40 regulates the polarity and flow of electricity from the batteries 42. The controller 40, in turn, is directed by incoming command signals 48. The controller 40 is coupled to a receiver 50, which can receive remotely broadcast control signals 48. The command signals 48 can be infrared signals, laser light signals or even audio signals. In the preferred embodiment, the command signals 48 are localized radio signals that operate as a personal area network, such as a Bluetooth® personal area network generated from a smart phone 52. In this manner, a person can control the flight of the drone system 10, using a software application 54 running on a smart phone 52. Furthermore, by measuring the strength of the personal area network transmitted by a smart phone 52, the controller 40 in the drone assembly 10 can determine when a person transmitting the command signals 48 is in effective range or out of effective range.

The drone assembly 10 carries other electronics within the propulsion module 12. The other electronics can include a camera 64, speakers 66 and a memory 68 capable of holding audio files and video files. When in flight, the drone assembly 10 is capable of recording video with the camera 64 and storing the video as a file in the memory 68. The video file can be downloaded when the drone assembly 10 is docked. Alternatively, the drone assembly 10 can be equipped with an optional transmitter (not shown) that enables the video files to be streamed to the smart phone 52.

Audio files, such as music or sound effects, can be stored in the memory 68 and can be played by the drone assembly 10 when in flight. The audio files can be stored in the memory 68 or can be streamed to the drone assembly 10. It will therefore be understood that music stored on the smart phone 52 can be transmitted to the drone assembly 10, wherein the drone assembly 10 will broadcast the music.

Sensors 55, in the form of proximity sensors and/or signal strength sensors can optionally be provided to enable the drone assembly 10 to fly autonomously in some circumstances. Likewise, lights 57 can be provided that are operated by the controller 50. The lights 57 can be used to internally illuminate the balloon construct 14. The lights 57 can come in a variety of colors and can be operated in any sequence by the controller 40. The lights 57 can also be used to illuminate an area under the balloon construct 14 if positioned in alignment with the bottom opening 28.

In flight, the electronics of the drone assembly 10 rely upon the software application 54 being run by the smart phone 52 for multiple functions. First, the person using the smart phone 52 can send specific flight instructions to the drone assembly 10, in the manner of a traditional remote control. As such, a person can steer the drone assembly 10 and can control the altitude of the drone assembly 10.

The drone assembly 10 can be kept aloft for many hours using only a small battery charge. This is because the drone assembly 10 is neutrally buoyant. No power is wasted in staying aloft. As such, power is only needed for lateral maneuvers and to operate the integrated electronics.

Figure 8:
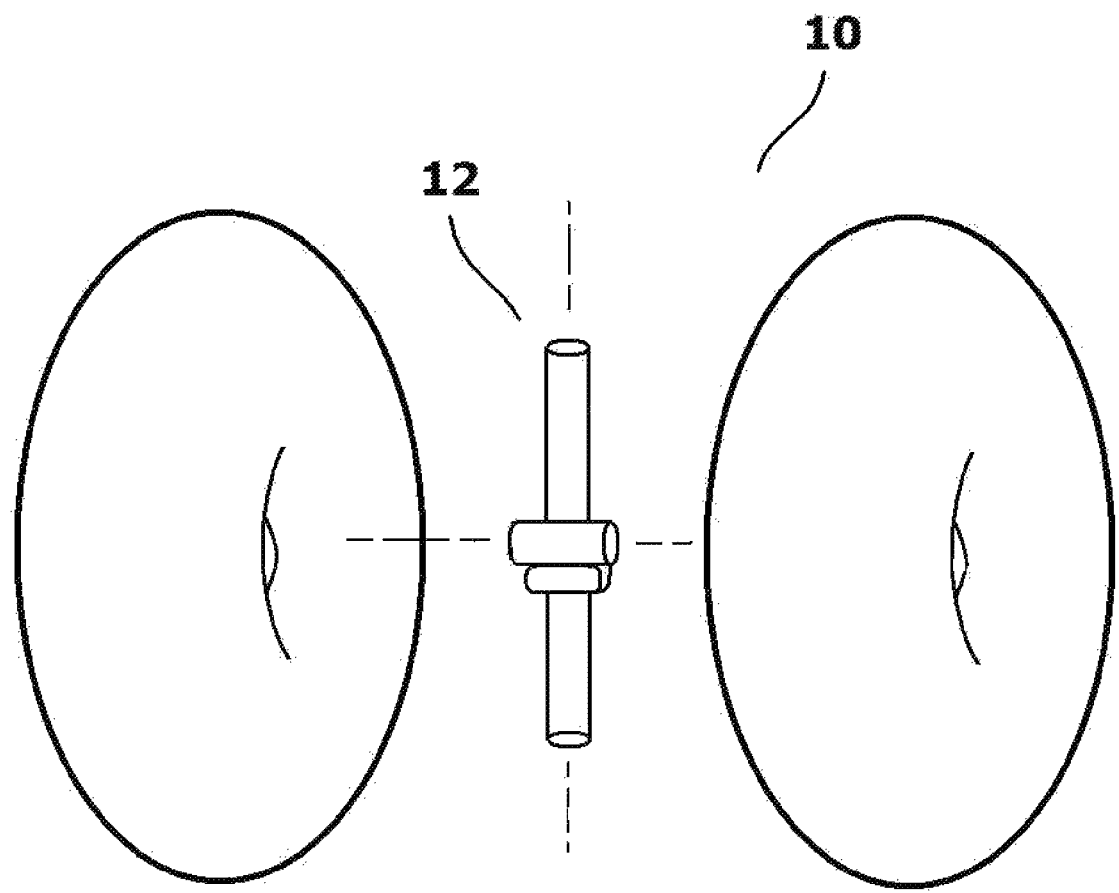
FIG. 8 shows an alternate embodiment of a balloon construct for the toy drone assembly.

Referring to FIG. 8, an alternate embodiment of a drone assembly 71 is shown. In this embodiment, an alternate balloon construct 73 is used. The balloon construct 73 is comprised of two traditional toric balloons 75 balloons that are affixed to opposite sides of the propulsion module 12.

Figure 9:
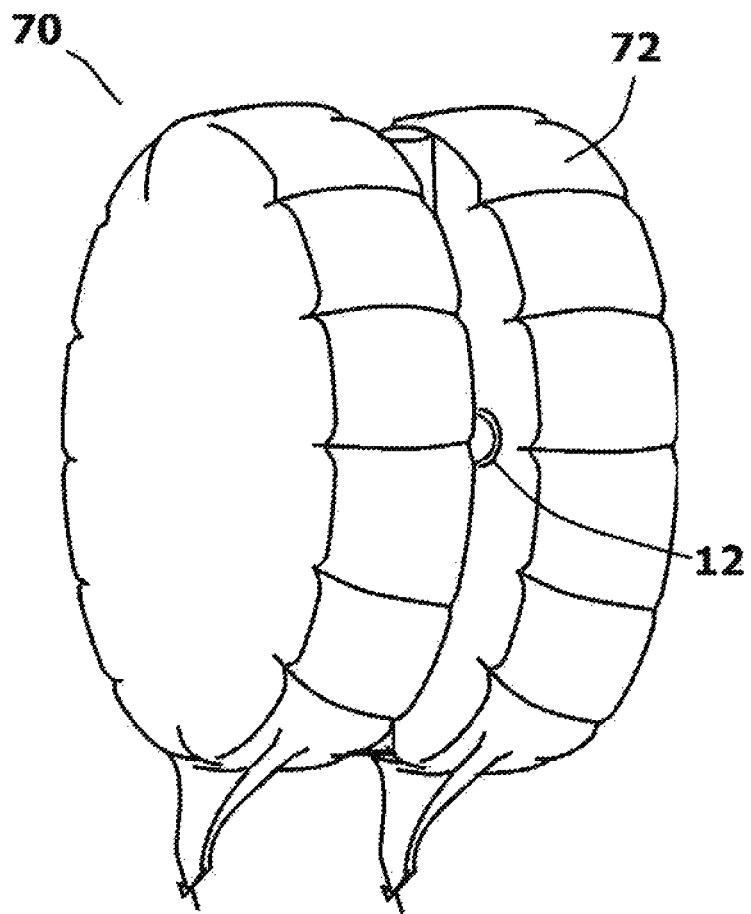
FIG. 9 shows an alternate embodiment of a balloon construct for the toy drone assembly.

Referring to FIG. 9, an alternate embodiment of a drone assembly 70 is shown. In this embodiment, an alternate balloon construct 72 is used. The balloon construct 72 is comprised of two traditional mylar balloons 74 that are affixed to opposite sides of the propulsion module 12.

Figure 10:
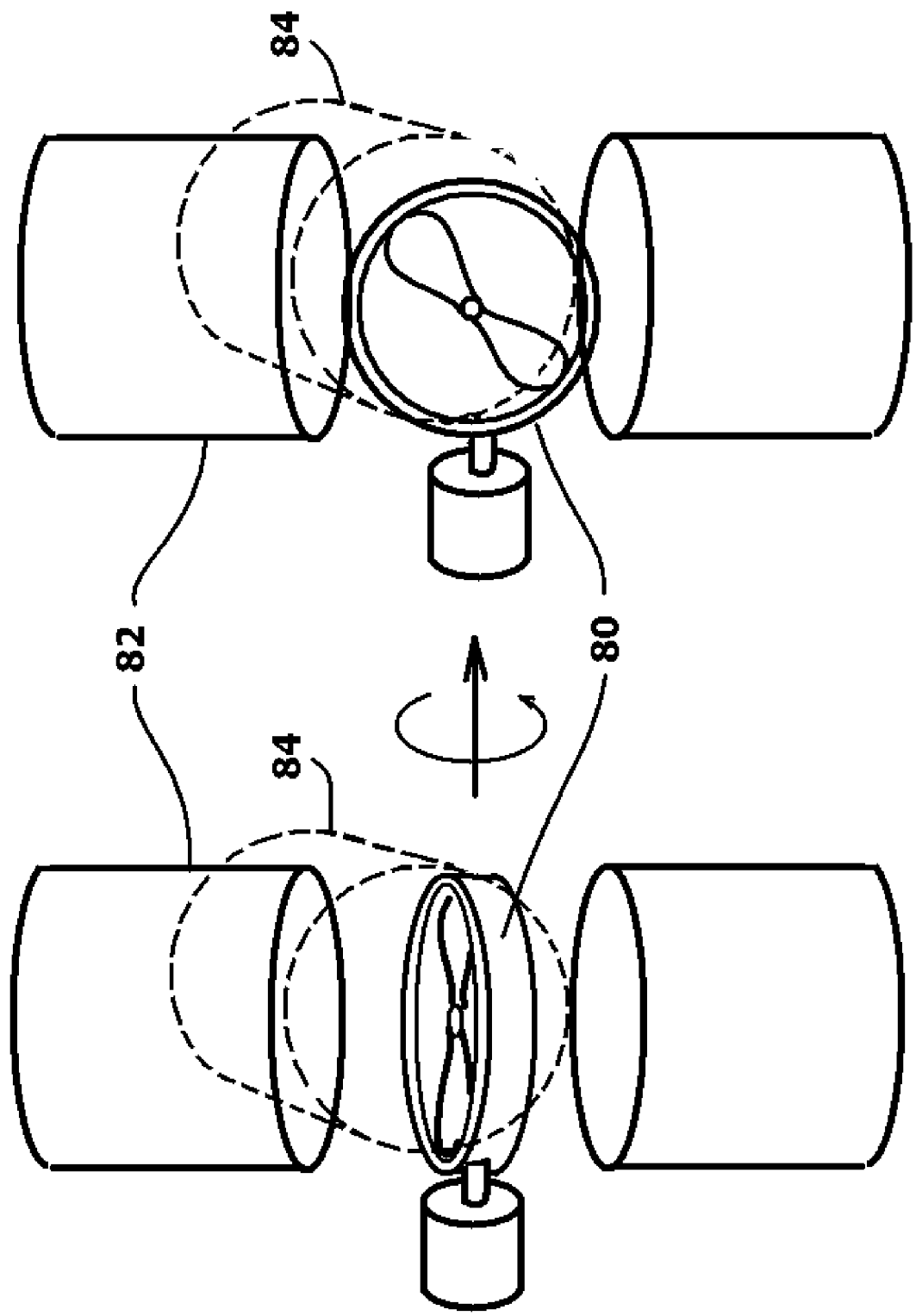
FIG. 10 shows an alternate configuration for the motorized propellers used within the propulsion module.

In the earlier embodiments, there are different motorized propellers operating in the first conduit and the second conduit. This need not be the case. Referring to FIG. 10, an alternate embodiment is shown where a motorized propeller 80 is provided that is capable of being changed in orientation. In a first orientation, the motorized propeller 80 can move air through a first vertical conduit 82. In a second orientation, the motorized propeller 80 can move air through a second horizontal conduit 84. Such a configuration can reduce the number of motorized propellers needed to move the drone assembly, It will be understood that the embodiments of the present invention that are illustrated and described are merely exemplary and that a person skilled in the art can make many variations to those embodiments. For instance, the drone assembly can be made to have many different configurations. All such embodiments and configurations are intended to be included within the scope of the present invention as defined by the claims.

What is claimed is:

1. A lighter-than-air toy drone assembly comprising:
    a balloon construct having a centralized area that is accessible through a top opening, a bottom opening and two side openings, wherein said balloon construct is symmetrically disposed about a vertical axis and both said top opening and said bottom opening are aligned on said vertical axis;
    a first conduit that progresses along said vertical axis between said top opening and said bottom opening;
    a first motorized propeller for selectively moving air through said first conduit, wherein movement of air through said first conduit does not act to rotate said balloon construct around said vertical axis;
    a second conduit that progresses along a second axis between said side openings, wherein said second axis is perpendicular to said vertical axis;
    a second motorized propeller for selectively moving air through said second conduit, wherein movement of air through said second conduit does not act to rotate said balloon construct around either said vertical axis or said second axis;
    a controller for controlling said first motorized propeller and said second motorized propeller in response to transmitted commend signals;
    at least one battery for powering said first motorized propeller and said second motorized propeller, wherein said at least one battery, said first conduit, said second conduit, said first motorized propeller, said second motorized propeller, and said controller have a combined weight;
    wherein said balloon construct is inflated with a lift gas, wherein said balloon construct creates lift that is at least equal to said combined weight.

2. The assembly according to claim 1, further including a third motorized propeller in said second conduit for selectively moving air through said second conduit.

3. The assembly according to claim 2, wherein said controller is capable of selectively rotating said second motorized propeller and said third motorized propeller in common directions and in opposite directions.

4. A lighter-than-air toy drone assembly comprising:
   a balloon construct symmetrically disposed about a first axis;
   a first conduit that progresses along said first axis;
   a first motorized propeller for selectively moving air through said first conduit;
   a second conduit that progresses along a second axis, wherein said second axis is perpendicular to said first axis;
   a set of motorized propellers disposed in said second conduit, wherein said set of motorized propellers can be selectively controlled to move air in a common direction and in opposing directions through said second conduit, wherein when said set of motorized propellers move air in opposite directions said set of motorized propellers create gyroscopic forces that act to rotate said balloon construct about said first axis;
   wherein said balloon construct is inflated with a lift gas.

5. The assembly according to claim 4, further including a controller for controlling said first motorized propeller and said set of motorized propellers in response to transmitted command signals.

6. The assembly according to claim 4, wherein said first axis of said first conduit is vertically oriented.

7. The assembly according to claim 4, wherein said second axis of said second conduit is horizontally oriented.

8. The assembly according to claim 7, wherein said balloon construct includes a balloon with an opening formed therethrough, wherein said opening aligns with said second axis.

9. The assembly according to claim 4, wherein said balloon construct includes a balloon with a first opening formed therethrough, wherein said first opening aligns with said second axis.

10. The assembly according to claim 2, wherein said balloon construct includes a balloon with a second opening formed therethrough, wherein said second opening aligns with said first axis.

11. The toy drone assembly according to claim 5, wherein said controller responds to command signals transmitted from a remote source.

12. A method of providing flight control to a lighter-than-air toy drone, said method comprising:
   providing at least one balloon that is inflated with a lift gas;
   providing a first conduit that is supported by said at least one balloon, wherein said first conduit progresses along a first axis, and wherein a first motorized propeller is disposed in said first conduit for selectively moving air through said first conduit to move said at least one balloon;
   providing a second conduit that is supported by said at least one balloon, wherein said second conduit progresses along a second axis, and wherein said second axis is perpendicular to said first axis;
   providing a set of motorized propellers, wherein said set of motorized propellers can be selectively controlled to move air in a common direction to move said at least one balloon along said second axis, and in opposing directions to generate a gyroscopic force that acts to rotate said at least one balloon about said first axis.

\* \* \* \* \*